United States Patent
Masuda et al.

(10) Patent No.: US 6,913,105 B2
(45) Date of Patent: Jul. 5, 2005

(54) SHOCK-ABSORBING MECHANISM FOR POWER-TRANSMISSION DEVICE

(75) Inventors: Toshiyuki Masuda, Kanagawa (JP); Masao Sakamoto, Kanagawa (JP); Shinichi Kondo, Kanagawa (JP); Masao Kishi, Kanagawa (JP)

(73) Assignee: Hitachi, Ltd., Tokyo-to (JP)

( * ) Notice: Subject to any disclaimer, the term of this patent is extended or adjusted under 35 U.S.C. 154(b) by 161 days.

(21) Appl. No.: 10/403,010

(22) Filed: Apr. 1, 2003

(65) Prior Publication Data

US 2003/0196846 A1 Oct. 23, 2003

(30) Foreign Application Priority Data

Apr. 22, 2002 (JP) ...................................... 2002-118834

(51) Int. Cl.⁷ ........................ B60K 17/24; B60K 17/02; B60K 17/22; B60K 17/26
(52) U.S. Cl. ........................ 180/381; 180/384; 188/376; 464/167
(58) Field of Search ................................ 180/381, 382, 180/384; 188/376, 377, 371; 464/146, 162, 167, 173, 178, 906; 277/412, 572, 634, 635, 636

(56) References Cited

U.S. PATENT DOCUMENTS

| | | | | |
|---|---|---|---|---|
| 4,185,838 A | * | 1/1980 | Danner ...................... 277/412 |
| 5,582,546 A | * | 12/1996 | Welschof ..................... 464/906 |
| 6,379,255 B1 | * | 4/2002 | Cermak et al. ............. 464/162 |
| 2003/0060293 A1 | * | 3/2003 | Iwano et al. ................ 464/173 |
| 2003/0096653 A1 | * | 5/2003 | Sugiyama et al. .......... 464/146 |

FOREIGN PATENT DOCUMENTS

| | | | | |
|---|---|---|---|---|
| JP | 10-250390 A | | 9/1998 | |
| JP | 10338046 A | * | 12/1998 | ........... B60K/17/22 |
| JP | 200130782 A | * | 2/2001 | ........... B60K/17/22 |
| JP | 200130785 A | * | 2/2001 | ........... B60K/17/24 |

* cited by examiner

Primary Examiner—Paul N. Dickson
Assistant Examiner—Joselynn Y. Sliteris
(74) Attorney, Agent, or Firm—Foley & Lardner LLP (57) ABSTRACT

A shock-absorbing mechanism for a power-transmission device includes a cylindrical driven-side shaft coupled to the driving-side shaft through a constant-velocity joint to be axially relatively slidable with respect to the driving-side shaft, a center bearing for rotatably supporting the driving-side shaft to the vehicle body, and a labyrinth mechanism for sealing the inside of the center bearing. An end of the driven-side shaft on the side of the driving-side shaft is disposed axially opposite to the labyrinth mechanism. When the two shafts are slid in the direction to approach each other by an axial load input thereto, the end of the driven-side shaft collides axially with the labyrinth mechanism.

11 Claims, 10 Drawing Sheets

FIG.11

SHOCK-ABSORBING MECHANISM FOR POWER-TRANSMISSION DEVICE

BACKGROUND OF THE INVENTION

The present invention relates to a shock-absorbing mechanism for a power-transmission device or propeller shaft for motor vehicles, and more particularly, to the shock-absorbing mechanism for absorbing an input load acting axially on the propeller shaft upon vehicle collision.

A typical shock-absorbing mechanism for a power-transmission device of this type is disclosed in JP-A 10-250390. This shock-absorbing mechanism is applied to a propeller shaft for motor vehicles, wherein the propeller shaft comprises a first shaft on the transmission side and a second shaft on the driving-wheel side, which are coupled together through a tripod universal joint. A rear end of the first shaft is formed with an outer race of the universal joint, whereas an end of the second shaft on the first-shaft side is formed with an inner shank having a front end arranged through the outer race.

The outer race is formed like a bottomed cylinder, wherein an opening opposite to a bottom wall is covered with an annular member and a boot, and an annular groove is formed in the outside face of the bottom wall. The inner shank is rotatably supported-to a vehicle body through a center bearing, and has a tripod arranged protuberantly at the outer periphery of the front end and positioned by an annular protrusion. The tripod is slidably engaged with three grooves formed in the inner peripheral face of the outer race, thus configuring the universal joint. The center bearing has a stepped cylindrical support member arranged at the outer periphery. An annular elastic body is integrated with the outer peripheral face of the support member.

Thus, if a collision occurs so that an impact is applied to the vehicle from the front to move the first shaft backward, the outer race is moved backward together with the first shaft to have the bottom wall colliding with the inner shank and the tripod.

Further backward movement of the outer race causes the inner shank to intensely push the bottom wall of the outer race, which is finally broken along the annular groove to allow penetration of the inner shank. At that time, colliding with a portion of the bottom wall exterior of the annular groove, the tripod is pushed back by the bottom wall. Then, the annular protrusion of the inner shank for positioning the tripod serves as a stopper to provide a given resistance. By breaking the annular protrusion over the given resistance, the inner shank is moved backward together with the tripod, thus obtaining shock-absorbing operation.

SUMMARY OF THE INVENTION

With the shock-absorbing mechanism disclosed in JP-A 10-250390, however, shock-absorbing operation is obtained by the inner shank breaking the bottom wall of the outer race along with the first shaft, and the tripod breaking and overpassing the annular protrusion of the inner shank, requiring extremely great energy for breaking of the bottom wall and the annular protrusion. Particularly, since a portion of the bottom wall exterior of the annular groove is larger in thickness to provide higher rigidity, and the annular protrusion itself has considerable strength to secure the coupling strength during ordinary stroke, a reaction force produced when colliding therewith becomes greater, leading to impossibility of a sufficient absorption of collision energy.

Further, the rigidities of the bottom wall and the annular protrusion are set uniformly due to their purpose of formation, and are difficult to be changed in accordance with the specifications and size of the vehicle, leading to impossibility of a full response to a required shock-absorbing load of the vehicle.

It is, therefore, an object of the present invention to provide a shock-absorbing mechanism for motor vehicles, which allows a sufficient absorption of collision energy and a full response to a required shock-absorbing load of the vehicle.

The present invention provides generally a shock-absorbing mechanism for a power-transmission device, which comprises: a first shaft which transmits torque; a second shaft coupled to the first shaft through a slide bearing, the second shaft being axially relatively slidable with respect to the first shaft, the second shaft being cylindrical; a center bearing arranged at an outer periphery of the first shaft, the center bearing supporting rotatably the first shaft to a vehicle body; and a labyrinth mechanism arranged at the outer periphery of the first shaft, the labyrinth mechanism sealing an inside of the center bearing, an end of the second shaft on a side of the first shaft being disposed axially opposite to the labyrinth mechanism; when the first and second shafts are slid in a direction to approach each other by an axial load input to the first and second shafts, the end of the second shaft colliding axially with the labyrinth mechanism.

BRIEF DESCRIPTION OF THE DRAWINGS

The other objects and features of the present invention will become apparent from the following description with reference to the accompanying drawings, wherein.

DETAILED DESCRIPTION OF THE INVENTION

Referring to the drawings, a description is made about a shock-absorbing mechanism for a power-transmission device for motor vehicles embodying the present invention. In the illustrative embodiments, the power-transmission device includes a propeller shaft 1.

Figure 1:
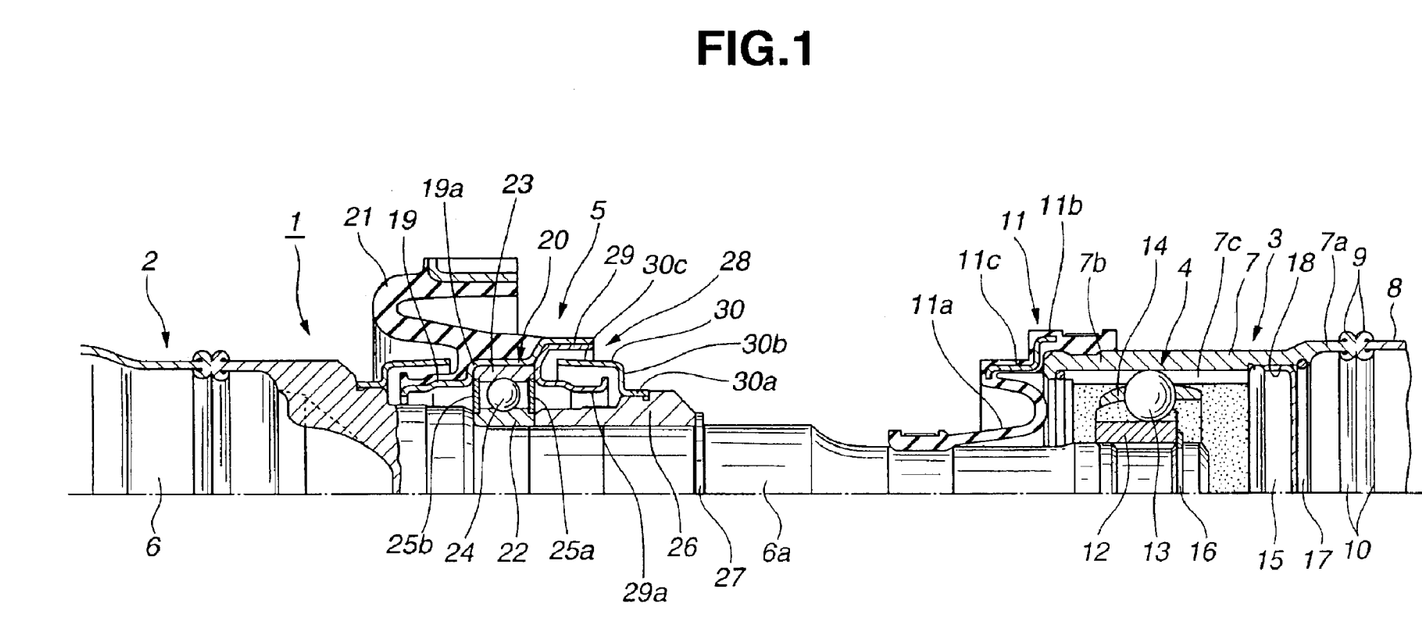
FIG. 1 is a longitudinal sectional view showing an upper half of a first embodiment of a shock-absorbing mechanism for a motor vehicle according to the present invention.

Referring to FIG. 1, propeller shaft 1 comprises essentially a driving shaft or first shaft 2 on the transmission side coupled to a transmission, a driven shaft or second shaft 3 on the driving-wheel side coupled axially to driving-side shaft 2 through a constant-velocity joint or slide bearing 4, and a center bearing 5 for rotatably supporting to a vehicle body an end of driving-side shaft 2 on the driven-side shaft 2 side. Constant-velocity joint 4 and center bearing 5 are disposed adjacent to each other at a short distance so as to fully reduce vehicle noise and vibration due to rotation of propeller shaft 1.

Driving-side shaft 2 comprises a tubular main body 6 on the transmission side and a stepped small-diameter stub axle 6*a* coupled axially to one end of main body 6 by friction welding. A small-diameter portion of stub axle 6*a* at the front end is arranged through driven-side shaft 2, constituting part of constant-velocity joint 4.

Driven-side shaft 2 comprises a cylindrical holder 7 constituting an outer race of constant-velocity joint 4 and a tubular shank 8 coupled axially to holder 7 by friction welding. An outside curl 9 and an inside curl 10 produced during friction welding remain at a coupling site of holder 7 and tubular shank 8.

Holder 7 has one end 7*a* on the tubular-shank 8 side which is stepped to have a larger diameter, and is smaller in thickness than other portions. Tubular shank 8 is of outer diameter roughly equal to that of one end 7*a* of holder 7, and is small in thickness as one end 7*a* is. One end 7*a* and tubular shank 8 are relatively small in thickness, but secure sufficiently large areas for friction welding.

A boot 11 is arranged between another end 7*b* of holder 7 and a front end of stub axle 6*a* to prevent intrusion of dust and the like into holder 7. Boot 11 comprises a rubber main body 11*a* and a reinforcing core 11*b* embedded therein. Main body 11*a* is formed roughly like a stepped-diameter cylinder, wherein a large-diameter base is engaged with an outer peripheral face of another end 7*b* of holder 7 through a cramp member, and a small-diameter head abuts on the outer periphery of stub axle 6*a* in the engaged state through the cramp member. Reinforcing core 11*b* is obtained by forming a metal sheet roughly like a stepped-diameter cylinder, and is essentially bent roughly like a crank within the base of main body 11*a*, wherein a front end 11*c* extends axially from the head of another end 7*b* of holder 7 to center bearing 5.

Constant-velocity joint 4 comprises an outer race comprised of holder 7, an annular inner race 12 arranged at the outer periphery of the small-diameter portion of stub axle 6*a*, balls 13 arranged between inner race 12 and holder 7 in a free rolling way, a cage 14 for holding balls 13, and a sealing plate 15 with roughly C-shaped cross section arranged in an inner end portion of holder 7 and for holding and sealing lubricating grease within holder 7.

Each ball 13 held in cage 14 has an outer edge held in a holding groove 7*c* formed axially in the inner peripheral face of holder 7. Holding groove 7*c* is smaller in inner diameter than an annular stepped groove 18 formed in an inner end portion of holder 7, so that the outer edge of ball 13 is disposed interior of the inner peripheral face of holding groove 7*c*. Therefore, the outer diameter of component members constituting constant-velocity joint 4 is set smaller than the inner diameter of inside curl 10. A snap ring 16 is engaged with a front end of the small-diameter portion of stub axle 6*a* to restrain axial movement of inner race 12.

Sealing plate 15 has an outer periphery press fitted into the inner peripheral race of stepped groove 18, and outer diameter smaller than inner diameter of inside curl 10. Moreover, sealing plate 15 is restrained from disengagement inward of tubular shank 8 by a C-ring 17 engaged with an end of stepped groove 18.

Center bearing 5 comprises a casing 19 arranged at the outer periphery of a medium-diameter portion of stub axle 6*a* and a ball bearing 20 accommodated in casing 19, and it is mounted to a floor of the vehicle body through a vibration proof rubber bush 21 arranged at the outer periphery of casing 19 and a bracket, not shown, arranged at the lower end thereof.

As shown in FIG. 1, ball bearing 20 comprises essentially an inner ring 22 fixed on the outer peripheral face of the medium-diameter portion of stub axle 6*a*, an outer ring 23 held at the inner periphery of a stepped medium-diameter portion 19*a* of casing 19, and steel balls 24 held in a circular groove formed in the center of the opposite faces of inner and outer rings 22, 23 in a free rolling way. Annular cover plates 25*a*, 25*b* are mounted to inner and outer rings 22, 23 at both axial ends.

Inner ring 22 has one edge supported on the stepped face of the medium-diameter portion of stub axle 6*a*, and another edge supported on the end face of a cylindrical retainer 26 engaged with the outer periphery of the medium-diameter portion of stub axle 6*a*. Retainer 27 is restrained from disengagement toward driven-side shaft 2 by a restraining ring 27 engaged with the outer periphery of the medium-diameter portion of stub axle 6*a*.

Outer ring 23 has one edge supported on an end of medium-diameter portion 19*a* of casing 19, and another edge supported on a roughly center portion of a support member 29 as will be described later, by which its axial positioning is achieved.

A labyrinth mechanism 28 is arranged between the large-diameter portion of casing 19 and retainer 26 to prevent intrusion of water, dust and the like into ball bearing 20. Labyrinth mechanism 28 is mounted to the large-diameter portion of casing 19 at the inner periphery, and comprises support member 29 bent like roughly laid U-shape and a sealing member 30 arranged at the outer periphery of retainer 26 and bent roughly like a crank.

Specifically, support member 29 and sealing member 30 are each obtained by bending a thin metal plate to have a section as described above. Support member 29 has an outer periphery engaged with the inner periphery of casing 19, and an inner periphery 29*a* disposed distant from retainer 26 with a predetermined clearance. Sealing member 30 comprises a small-diameter base 30*a* engaged with the outer periphery of retainer 26 and a head 30*c* extending roughly horizontally from a rising portion 30*b* located in the center and engaged in support member 29. Moreover, sealing member 30 is set such that the radial position of formation of rising portion 30*b* is substantially equal to the position of formation of front end 11*c* of reinforcing core 11*b* of boot 11.

Figure 2:
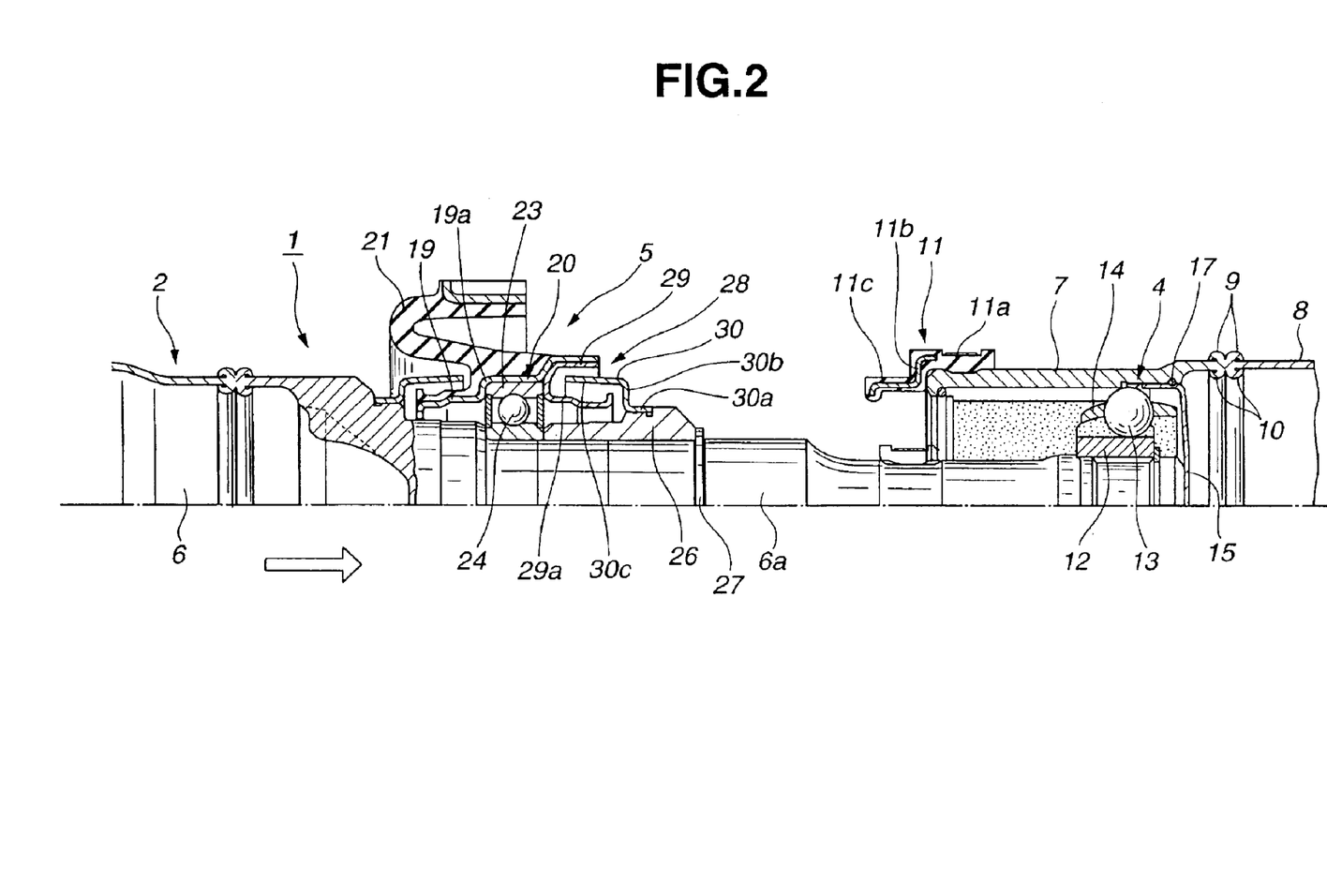
FIG. 2 is a view similar to FIG. 1, explaining operation of the first embodiment upon vehicle collision.

In this embodiment, therefore, since a collision load is input to driving-side shaft 2 from the transmission side, i.e. in the direction of arrow in FIG. 2, upon vehicle collision or the like, driving-side shaft 2 makes a stroke toward driven-side shaft 3. And when center bearing 20 and labyrinth mechanism 28 make a stroke by a predetermined amount, the front end of boot 11 is cut away.

Figure 3:
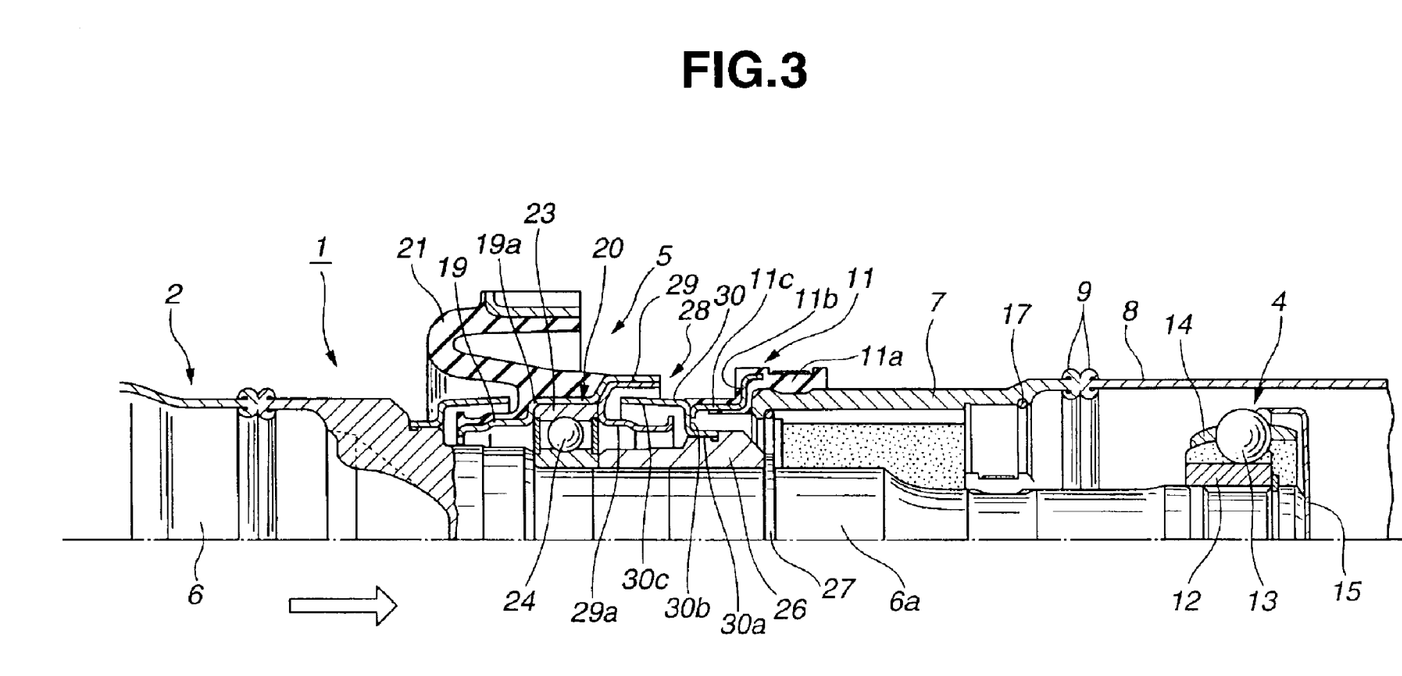
FIG. 3 is a view similar to FIG. 2, explaining operation of the first embodiment.
Figure 4:
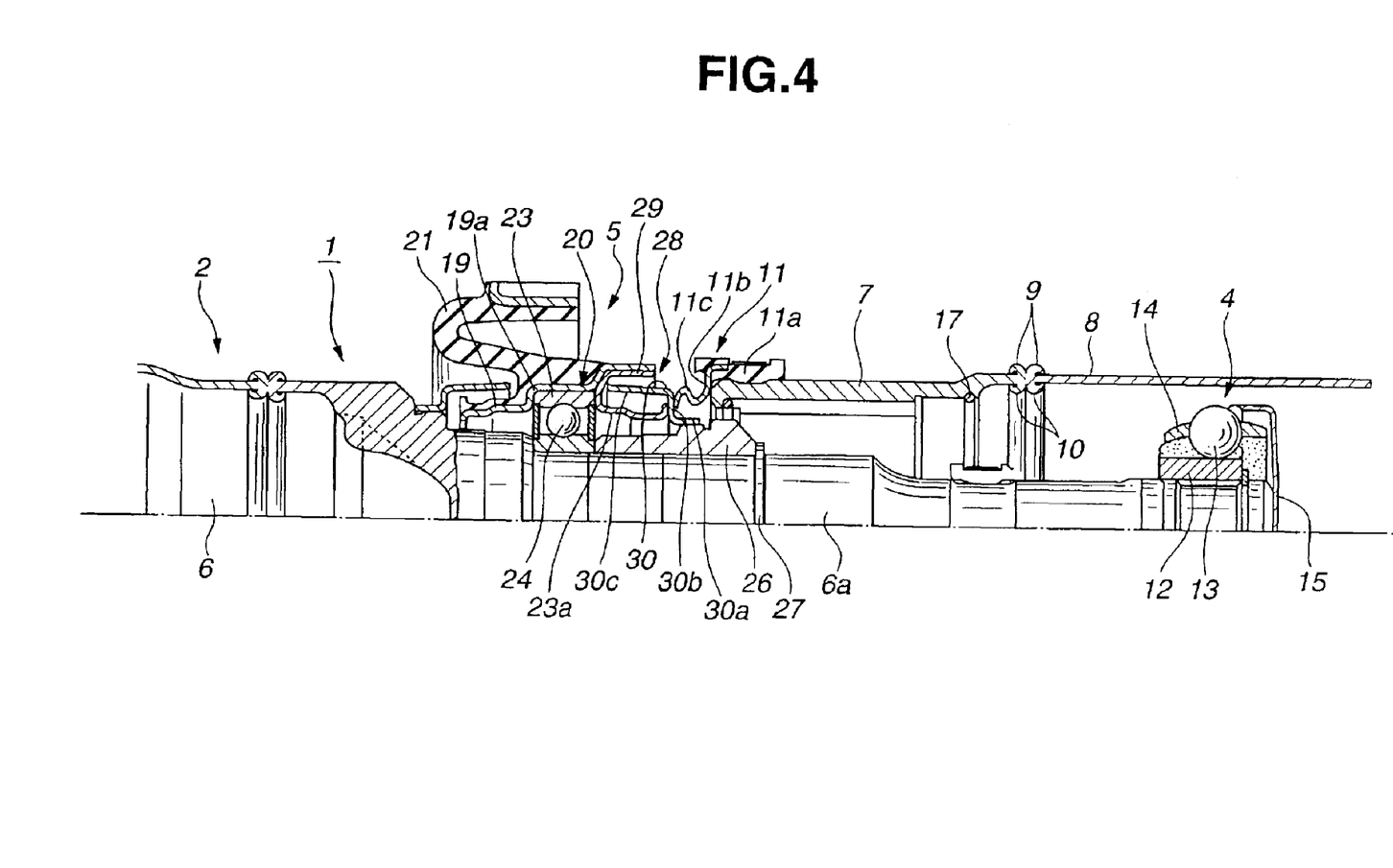
FIG. 4 is a view similar to FIG. 3, explaining operation of the first embodiment.

Referring to FIGS. 3 and 4, when driving-side shaft 2 makes a further stroke in the same direction, the outside face of rising portion 30*b* of sealing member 30 of labyrinth mechanism 28 meets axially front end 11*c* of reinforcing core 11*b* of boot 11, absorbing collision energy once. By this input load, reinforcing core 11*b* is axially crushed and deformed, absorbing collision energy.

Figure 5:
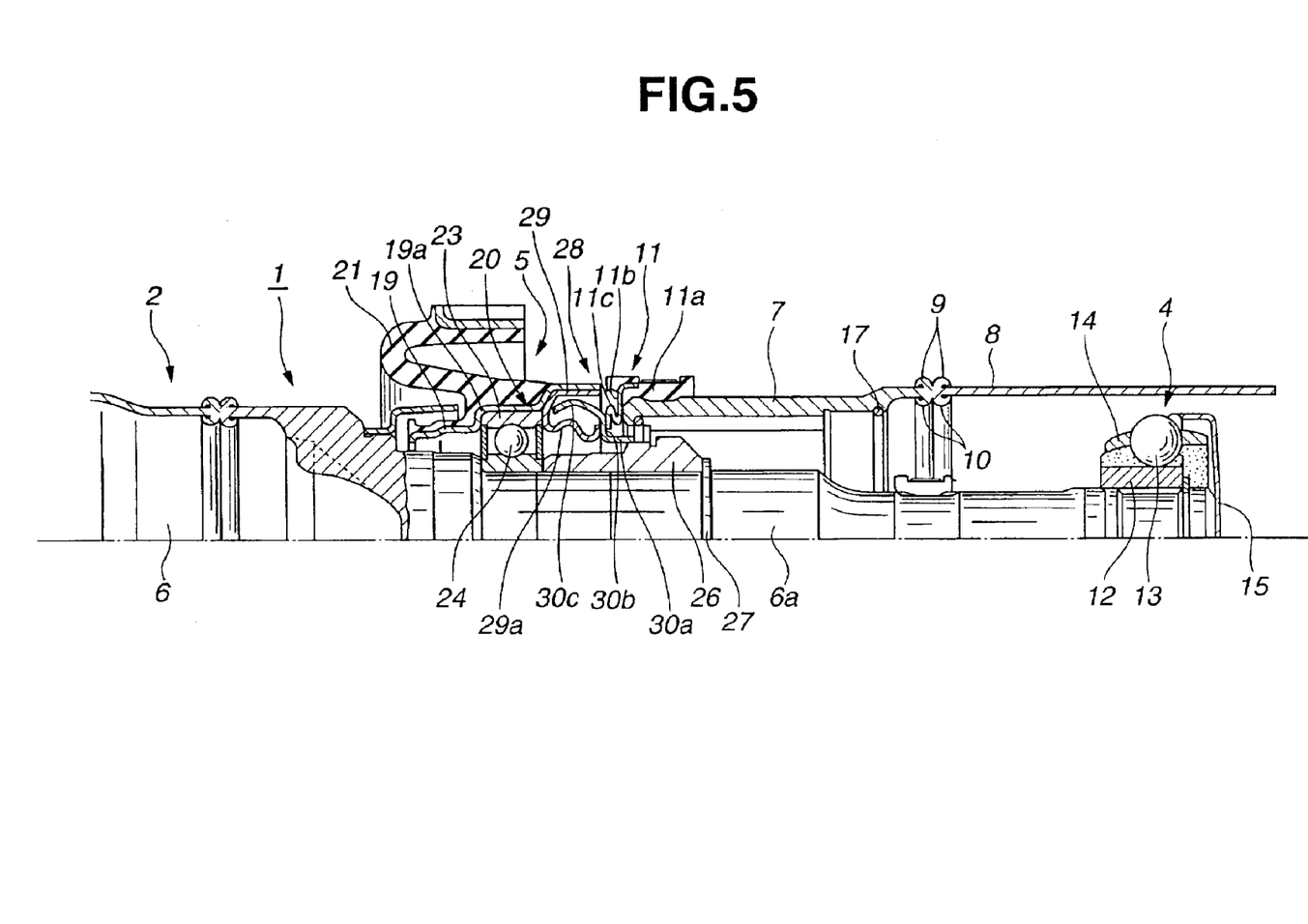
FIG. 5 is a view similar to FIG. 4, explaining operation of the first embodiment.

When driving-side shaft 2 makes a further stroke in the same direction, reinforcing core 11*b* crashed as shown in FIG. 5 causes crush/deformation of not only rising portion 30b of sealing member 30 and front end 11c of reinforcing core 11, but also the inner periphery of support member 29. Thus, crush/deformation of two members 29, 30 allows an effective absorption of collision energy.

In such a way, in this embodiment, crush/deformation of reinforcing core 11b and labyrinth mechanism 28 provides an absorption of collision energy, allowing achievement of excellent shock-absorbing performance.

Further, since labyrinth mechanism 28 is used to fulfill a purpose of sealing center bearing 20, the thickness and the like of support member 29 and sealing member 30 can be set optionally, enhancing the rigidity and design flexibility thereof. This allows free modification of the required shock-absorbing performance in accordance with the specifications of the vehicle.

Still further, the above stroke of driving-side shaft 2 causes constant-velocity joint 4 to slide, together with driving-side shaft 2, inward of tubular shank 8 from the inside of holder 7 of driven-side shaft 3. With this, the front end of stub axle 6a and constant-velocity joint 4 push sealing plate 15 inward of tubular shank 8. Thus, referring to FIGS. 2 and 3, sealing plate 15 is deformed by such input load so that the outer peripheral face is pushed inward in overpassing C-ring 17. Therefore, a friction resistance is operative during deformation of sealing plate 15 and overpassing of C-ring 17, obtaining an absorption of collision energy.

Furthermore, a relative stroke amount of driving-side shaft 2 with respect to driven-side shaft 3 is greater, enhancing a shock-absorbing effect upon vehicle collision, allowing further cushioning of an impact to be applied to an occupant or passenger.

Further, in this embodiment, holder 7 of driven-side shaft 3 serves as outer race of constant-velocity joint 4, allowing a reduction in the number of parts, leading to enhancement in manufacturing efficiency and cost reduction.

Figure 6:
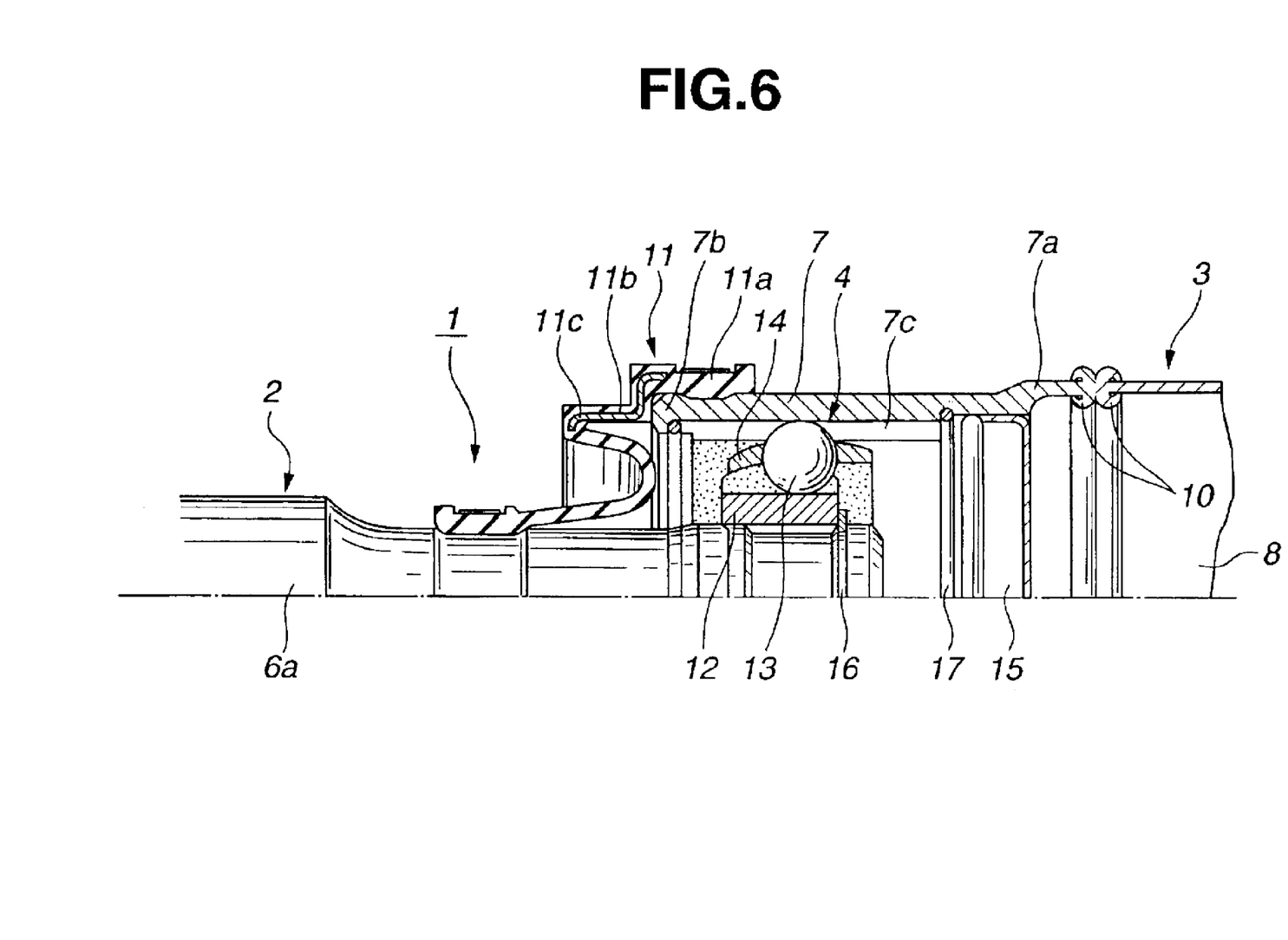
FIG. 6 is a fragmentary sectional view showing a second embodiment of the present invention.

Referring to FIG. 6, there is shown second embodiment of the present invention wherein C-ring 17 is arranged inside sealing plate 15, and not outside it, so that with a stroke of driving-side shaft 2, balls 13 of constant-velocity joint 4 overpass C-ring 17 directly. Thus, a friction resistance is slightly greater than that when overpassing sealing plate 15, obtaining increased energy absorbing ability.

Figure 7:
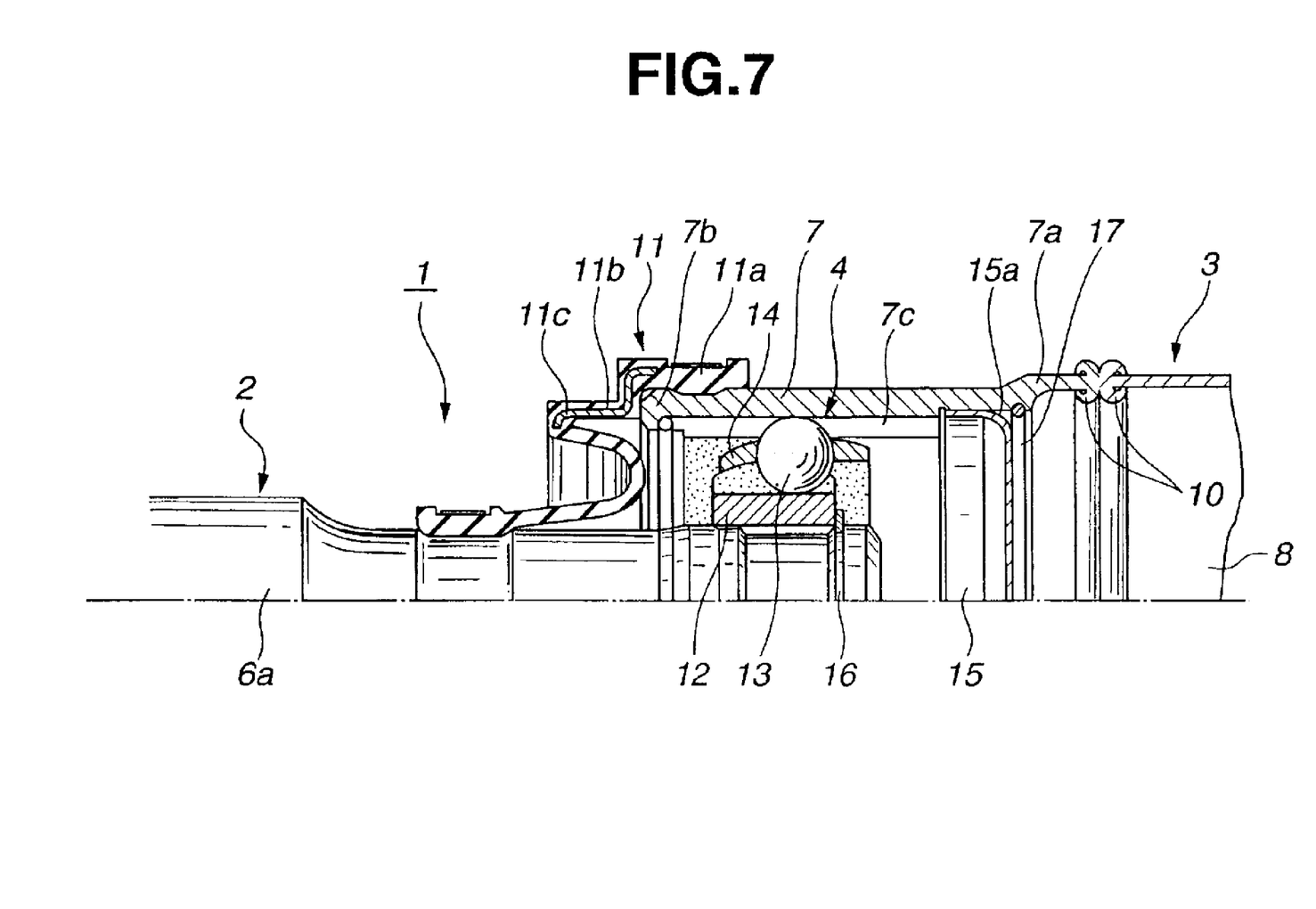
FIG. 7 is a view similar to FIG. 6, showing a third embodiment of the present invention.

Referring to FIG. 7, there is shown third embodiment of the present invention wherein an outside face 15a of the outer periphery of sealing plate 15 on the C-ring 17 side is tapered. Thus, with a stroke of driving-side shaft 2, sealing plate 15 can overpass C-ring 17 easily, having smaller friction resistance, resulting in excellent stroke-ability of driving-side shaft 2. Therefore, the third embodiment is preferably applicable to a shock-absorbing mechanism requiring not so great friction resistance resulting from sealing plate 15.

Figure 8:
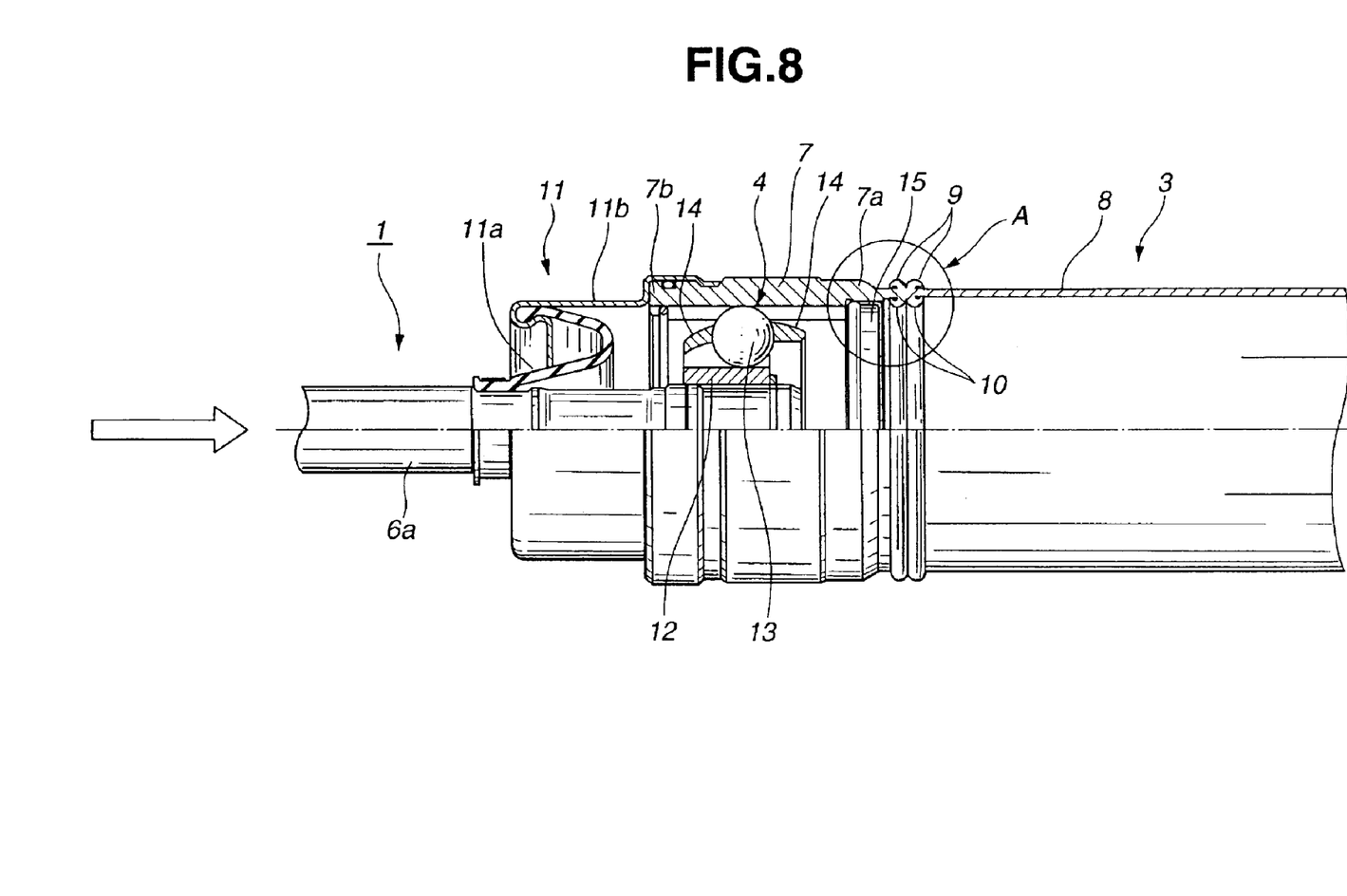
FIG. 8 is a view similar to FIG. 7, showing a fourth embodiment of the present invention.
Figure 9:
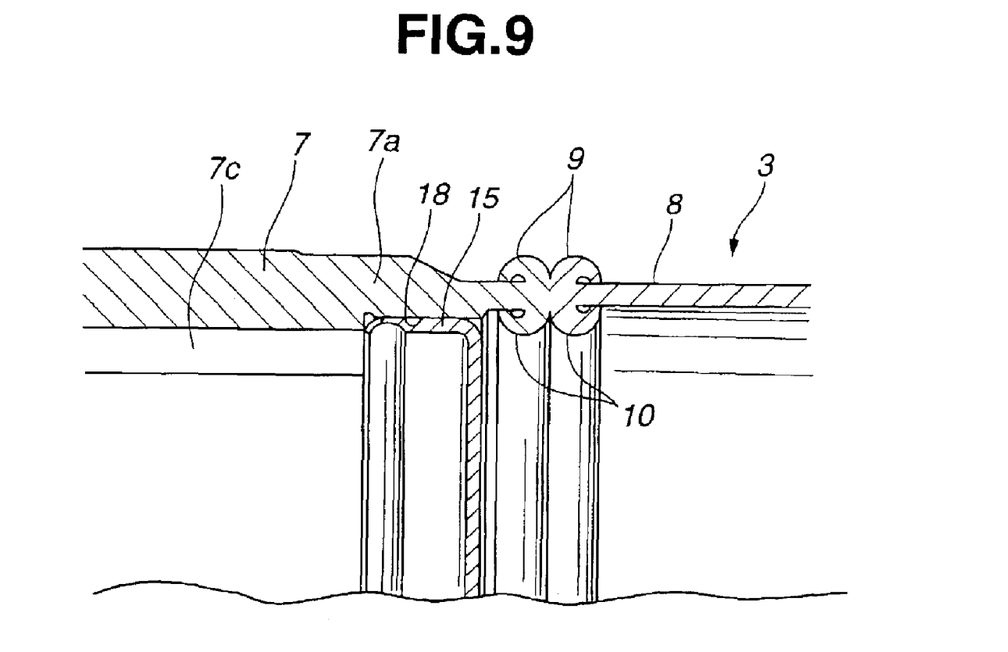
FIG. 9 is an enlarged view showing a part A in FIG. 8.
Figure 10:
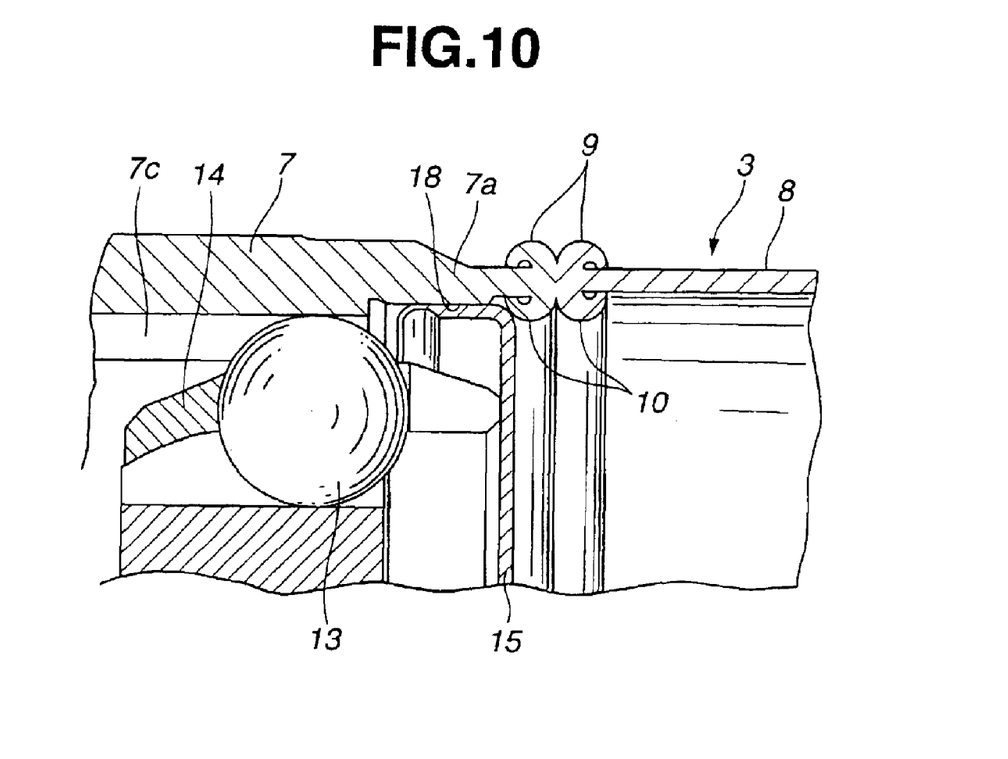
FIG. 10 is a view similar to FIG. 9, explaining operation of the fourth embodiment.

Referring to FIGS. 8–10, there is shown fourth embodiment of the present invention wherein the outer diameter of holder 7 of driven-side shaft 3 and that of tubular shank 8 are set equal to each other, the position of friction welding between the two 7, 8 is set adjacent to sealing plate 15, and the inner diameter of inside curl 10 produced by friction welding is set smaller than the outer diameter of sealing plate 15. Boot 11 comprises rubber main body 11a and reinforcing core 11b formed separately.

In the fourth embodiment, therefore, as shown in FIG. 10, with a stroke of driving-side shaft 2, an end of cage 14 of constant-velocity joint 4 meets the inside face of the outer periphery of sealing plate 15 to push sealing plate 15 inward of tubular shank 8. Then, the outer periphery of sealing plate 15 meets and overpasses the side of inside curl 10 in being deformed, producing a relatively great friction resistance. Thus, an 10 effective absorption of collision energy can be achieved at this portion. Particularly, greater rigidity of inside curl 10 contributes to achievement of relatively great friction resistance. Therefore, the fourth embodiment is preferably applicable to a shock-absorbing mechanism requiring greater friction resistance resulting from sealing plate 15.

Figure 11:
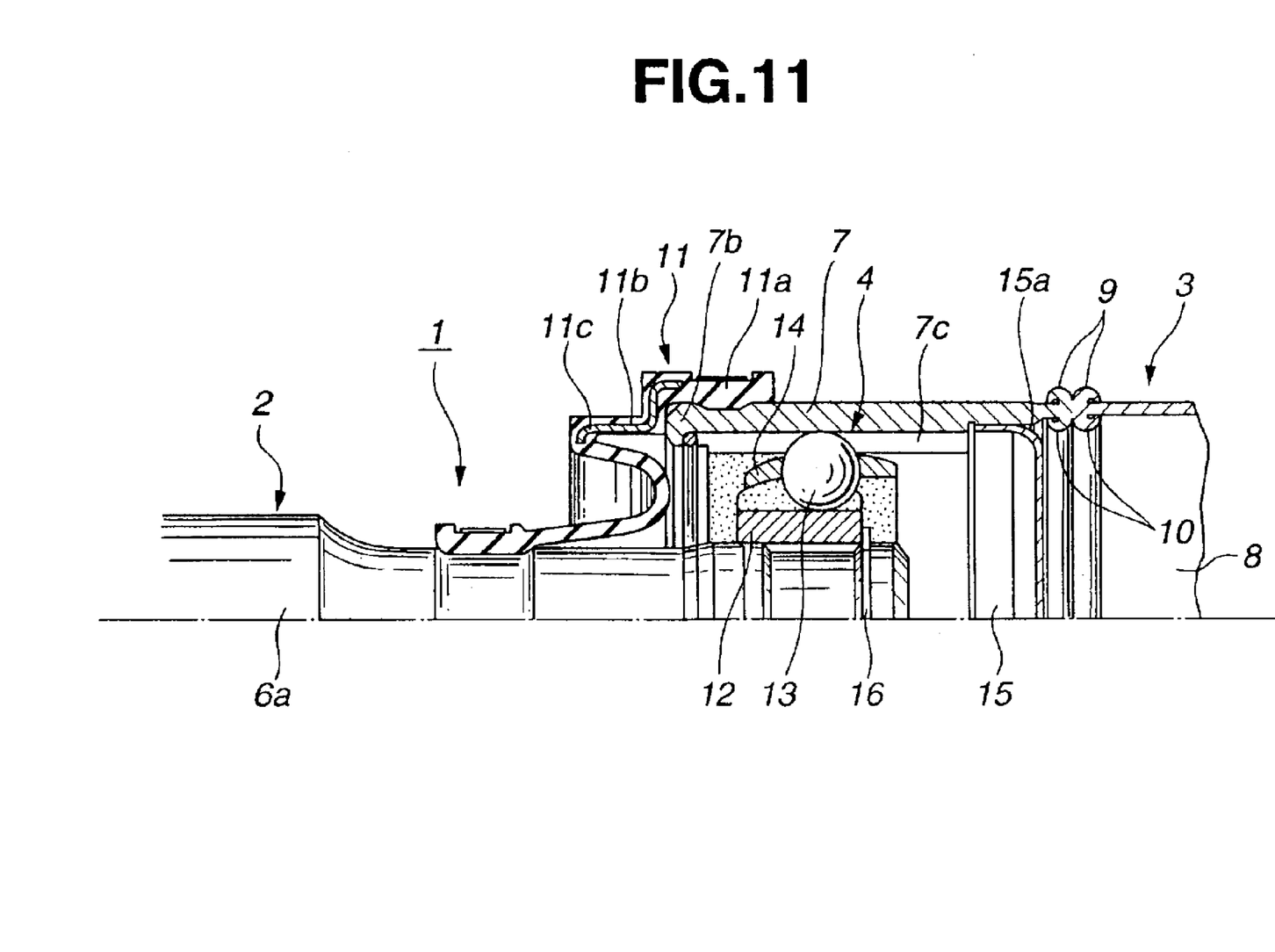
FIG. 11 is a view similar to FIG. 8, showing a fifth embodiment of the present invention.

Referring to FIG. 11, there is shown fifth embodiment of the present invention which is substantially the same as the fourth embodiment except that outside face 15a of the outer periphery of sealing plate 15 is tapered as shown in FIG. 7 so that sealing plate 15 can overpass inside curl 10 easily to obtain smaller friction resistance.

Having described the present invention in connection with the illustrative embodiments, it is noted that the present invention is not limited thereto, and various changes and modifications can be made without departing from the scope of the present invention. By way of example, the present invention is applicable to any power-transmission device other than the propeller shaft.

Further, the thickness of support member 29 and sealing member 30 of labyrinth mechanism 28 may be increased to enhance the rigidity, or decreased to lower the rigidity. This allows accurate achievement of required shock-absorbing performance in accordance with the specifications of the vehicle.

Furthermore, boot 11 can be removed so that another end 7b of holder 7 meets labyrinth mechanism 28 directly.

The entire contents of Japanese Patent Application P2002-118834 filed Apr. 22, 2002 are incorporated hereby by reference.

What is claimed is:

1. A shock-absorbing mechanism for a power-transmission device, comprising:

a first shaft which transmits torque;

a second shaft coupled to the first shaft through a slide bearing, the second shaft being axially relatively slidable with respect to the first shaft, the second shaft being cylindrical;

a center bearing arranged at an outer periphery of the first shaft, the center bearing supporting rotatably the first shaft to a vehicle body; and a labyrinth mechanism arranged at the outer periphery of the first shaft, the labyrinth mechanism sealing an inside of the center bearing, an end of the second shaft on a side of the first shaft being disposed axially opposite to the labyrinth mechanism;

when the first and second shafts are slid in a direction to approach each other by an axial load input to the first and second shafts, the end of the second shaft colliding axially with the labyrinth mechanism.

2. The shock-absorbing mechanism as claimed in claim 1, further comprising a cylindrical boot arranged at the end of the second shaft, the boot sealing an inside of the slide bearing, the boot comprising a reinforcing core arranged therein to extend toward the labyrinth mechanism, wherein when the first and second shafts are axially slid to approach each other, the boor collides with the labyrinth mechanism through the reinforcing core.

3. The shock-absorbing mechanism as claimed in claim 2, further comprising a sealing plate fixed at an inner peripheral face of the second shaft and at a position adjacent to the slide bearing and on an opposite side with respect to the center bearing, wherein when the first and second shafts are axially slid to approach each other, the slide bearing pushes the sealing plate out axially.

4. The shock-absorbing mechanism as claimed in claim 3, further comprising a C-ring restraining from engagement of the sealing plate.

5. The shock-absorbing mechanism as claimed in claim 4, wherein the C-ring is arranged outside the sealing plate.

6. The shock-absorbing mechanism as claimed in claim 4, wherein the C-ring is arranged inside the sealing plate.

7. The shock-absorbing mechanism as claimed in claim 3, wherein the sealing plate has at an outer periphery an outside face tapered on a side of the C-ring.

8. The shock-absorbing mechanism as claimed in claim 3, wherein the second shaft comprises a holder and a tubular shank, the holder and the tubular shank having the same outer diameter, wherein a position of friction welding between the holder and the tubular shank is disposed adjacent to the sealing plate, wherein an inner diameter of an inside curl produced by friction welding is smaller than an outer diameter of the sealing plate.

9. The shock-absorbing mechanism as claimed in claim 8, wherein the sealing plate has at an outer periphery an outside face tapered on a side of the C-ring.

10. The shock-absorbing mechanism as claimed in claim 1, wherein the labyrinth mechanism is disposed at an outer periphery of the first shaft, the labyrinth mechanism comprising a support member and a sealing member having an end engaged in the support member, the support member being obtained by bending a metal plate to have a roughly laid U-shaped section, the sealing member being obtained by bending a metal plate roughly like a crank.

11. A motor vehicle, comprising:
   a power-transmission device; and
   a shock-absorbing mechanism comprising:
   a first shaft which transmits torque;
   a second shaft coupled to the first shaft through a slide bearing, the second shaft being axially relatively slidable with respect to the first shaft, the second shaft being cylindrical;
   a center bearing arranged at an outer periphery of the first shaft, the center bearing supporting rotatably the first shaft to a vehicle body; and
   a labyrinth mechanism arranged at the outer periphery of the first shaft, the labyrinth mechanism sealing an inside of the center bearing,
   an end of the second shaft on a side of the first shaft being disposed axially opposite to the labyrinth mechanism;
   when the first and second shafts are slid in a direction to approach each other by an axial load input to the first and second shafts, the end of the second shaft colliding axially with the labyrinth mechanism.

* * * * *